United States Patent [19]

Agrawal et al.

[11] Patent Number: 5,799,311
[45] Date of Patent: *Aug. 25, 1998

[54] METHOD AND SYSTEM FOR GENERATING A DECISION-TREE CLASSIFIER INDEPENDENT OF SYSTEM MEMORY SIZE

[75] Inventors: Rakesh Agrawal; Manish Mehta, both of San Jose, Calif.; John Christopher Shafer, Amherst, Mass.

[73] Assignee: International Business Machines Corporation, Armonk, N.Y.

[*] Notice: The term of this patent shall not extend beyond the expiration date of Pat. No. 5,787,274.

[21] Appl. No.: 646,893

[22] Filed: May 8, 1996

[51] Int. Cl.$^6$ .................................................. G06F 17/30
[52] U.S. Cl. .................. 707/102; 364/225.3; 364/225.4; 364/282.3; 364/974; 364/DIG. 1; 364/DIG. 2; 711/100; 382/36
[58] Field of Search .......................... 395/613; 364/200, 364/225.3, 225.4, 282.3, 974; 707/102; 711/100; 382/36

[56] References Cited

U.S. PATENT DOCUMENTS

| 4,719,571 | 1/1988 | Rissanen et al. | 364/300 |
|---|---|---|---|
| 5,418,946 | 5/1995 | Mori | 395/613 |
| 5,463,773 | 10/1995 | Sakakibara et al. | 395/613 |

OTHER PUBLICATIONS

R.G.& G. Nagy, "Decision tree design using probabilistic model," IEEE Trans, vol. 30, pp. 191–199, Jan. 1984.
Gini index, L Breiman, J. H. Friedman, R. A. Olshen, & C. Stone, "Classification & Regression Trees", Wadsworth International Group, Belmont, CA, Jan. 1984.

Moura Pires, "Adecision Tree Algorithm with Segmenation", Proceedings IECON 91, International Conference on Industrial Electronics Control, and Instrumentation, vol. 3, pp. 2077–2082, Nov. 1991.
J. R. Quinlan, "Introduction of Decision Trees," (Abstract), Machine Learning 1:86–106, Jan. 1986.
Mehta et al., "A fast scalable classifier for data mining,"In EDBT 96, Avignon, France, Mar. 1996.
R. Agrawal et al., An Interval Classifier for Database Mining Applications, Proceedings of the 18th VLDB Conference Vancouver, British Columbia, Aug. 1992.

(List continued on next page.)

*Primary Examiner*—Thomas G. Black
*Assistant Examiner*—Jean M. Corrielus
*Attorney, Agent, or Firm*—Khanh Q. Tran

[57] ABSTRACT

A method and system are disclosed for generating a decision-tree classifier from a training set of records, independent of the system memory size. The method comprises the steps of: generating an attribute list for each attribute of the records, sorting the attribute lists for numeric attributes, and generating a decision tree by repeatedly partitioning the records using the attribute lists. For each node, split points are evaluated to determine the best split test for partitioning the records at the node. Preferably, a gini index and class histograms are used in determining the best splits. The gini index indicates how well a split point separates the records while the class histograms reflect the class distribution of the records at the node. Also, a hash table is built as the attribute list of the split attribute is divided among the child nodes, which is then used for splitting the remaining attribute lists of the node. The created tree is further pruned based on the MDL principle, which encodes the tree and split tests in an MDL-based code, and determines whether to prune and how to prune each node based on the code length of the node.

51 Claims, 7 Drawing Sheets

OTHER PUBLICATIONS

R. Agrawal et al., Database Mining: A Performance Perspective, IEEE Transactions on Knowledge and Data Engineering, vol. 5, No. 6, pp. 914–925, Special Issue on Learning and Discovery in Knowledge–Based Databases, Dec. 1993.

L. Breiman (Univ. of CA–Berkeley) et al. Classification and Regression Trees (Book) Chapter 2. Introduction to Tree Classification pp. 18–58, Wadsworth International Group, Belmont, CA 1984.

J. Catlett, Megainduction: Machine Learning on Very Large Databases, PhD thesis, Univ. of Sydney, Jun./Dec. 1991.

P. K. Chan et al., Experiments on Multistrategy Learning by Meta–learning. In Proc. Second Intl. Conf. on Info. and Knowledge Mgmt., pp. 314–323, 1993.

U. Fayyad et al., The Attribute Selection Problem in Decision Tree Generation. In 105h Nat'l Conf. on AI AAAI-92, Learning: Inductive 1992.

M. James, Classification Algorithms (book). Chapters 1–3, QA278.65, J281 Wiley–Interscience Pub., 1985.

M. Mehta et al., Mdl–based Decision Tree Pruning. Int'l Conference on Knowledge Discovery in Databases and Data Mining (KDD–95) Montreal, Canada, pp. 216–221, Aug. 1995.

J. R. Quinlan et al., Inferring Decision Trees Using Minimum Description Length Principle, Information and Computation 80, pp. 227–248, 1989. (0890–5401/89 Academic Press, Inc.).

Wallace et al., Coding Decision Trees, Machine Learning, 11, pp. 7–22, 1993. (Kluwer Academic Pub., Boston. Mfg. in the Netherlands.).

S. M. Weiss et al., Computer Systems that learn, Classification and Prediction Methods from Statistics, Neural Nets, Machine Learning, and Expert Systems, pp. 113–143, 1991. Q325.5, W432, C2, Morgan Kaufmann Pub. Inc., San Mateo, CA.

M. Mehta, R. Agrawal & J. Rissanen, SLIQ: Fast Scalable Classifier for Data Mining. In EDBT 96, Avignon, France, March 1996.

R. P. Lippmann, An Introduction to Computing with Neural Nets, IEEE ASSP Magazine, pp. 4–22, 0740–7467/87/0400, Apr. 1987.

D. E. Goldberg, Genetic Algorithms in Search, Optimization, and Machine Learning, Chapter 6, Intro. to Genetics Based Machine Learning, pp. 218–257, (Book), 1989.

U.S. Application No. 08/500,717, filed Jul. 11, 1995, for System and Method for Parallel Mining of Association Rules in Databases.

U.S. Application No. 08/541,665, filed Oct. 10, 1995, for Method and System for Mining Generalized Sequential Patterns in a Large Database.

U.S. Application No. 08/564,694, filed Nov. 29, 1995, for Method and System for Generating a Decision–tree Clarifier for Data Records.

No serial number. Filed May 1, 1996, IBM Doc. No. AM9–96–015, Method and System for Generating a Decision–Tree Classifier in Parallel in a Multi–Processor System.

Attribute List

| Age | Class | Rec ID |
|---|---|---|
| 17 | High | 1 |
| 20 | High | 5 |
| 23 | High | 0 |
| 32 | Low | 4 |
| 43 | High | 2 |
| 68 | Low | 3 |

Position of cursor in scan:
← Position 0
← Position 3
← Position 6

*FIG. 9a*

State of Class Histograms

Cursor Position 0:

|  | High | Low |
|---|---|---|
| $C_{below}$ | 0 | 0 |
| $C_{above}$ | 4 | 2 |

Cursor Position 3:

|  | High | Low |
|---|---|---|
| $C_{below}$ | 3 | 0 |
| $C_{above}$ | 1 | 2 |

Cursor Position 6:

|  | High | Low |
|---|---|---|
| $C_{below}$ | 4 | 2 |
| $C_{above}$ | 0 | 0 |

*FIG. 9b*

Attribute List

| Car Type | Class | Rec.ID |
|---|---|---|
| family | High | 0 |
| sports | High | 1 |
| sports | High | 2 |
| family | Low | 3 |
| truck | Low | 4 |
| family | High | 5 |

*FIG. 10a*

State of Class Histogram

|  | High | Low |
|---|---|---|
| family | 2 | 1 |
| sports | 2 | 0 |
| truck | 0 | 1 |

Attribute Lists for node N0

| Age | Class | Rec ID |
|---|---|---|
| 17 | High | 1 |
| 20 | High | 5 |
| 23 | High | 0 |
| 32 | Low | 4 |
| 43 | High | 2 |
| 68 | Low | 3 |

| Car Type | Class | Rec.ID |
|---|---|---|
| family | High | 0 |
| sports | High | 1 |
| sports | High | 2 |
| family | Low | 3 |
| truck | Low | 4 |
| family | High | 5 |

Attribute Lists for node N1

| Age | Class | Rec.ID |
|---|---|---|
| 17 | High | 1 |
| 20 | High | 5 |
| 23 | High | 0 |

65

| Car Type | Class | Rec.ID |
|---|---|---|
| family | High | 0 |
| sports | High | 1 |
| family | High | 5 |

67

Attribute Lists for node N2

| Age | Class | Rec.ID |
|---|---|---|
| 32 | Low | 4 |
| 43 | High | 2 |
| 68 | Low | 3 |

66

| Car Type | Class | Rec.ID |
|---|---|---|
| sports | High | 2 |
| family | Low | 3 |
| truck | Low | 4 |

| Rec.ID | Node |
|---|---|
| 1 | N1 |
| 5 | N1 |
| 0 | N1 |
| 4 | N2 |
| 2 | N2 |
| 3 | N2 |

*FIG. 16*

METHOD AND SYSTEM FOR GENERATING A DECISION-TREE CLASSIFIER INDEPENDENT OF SYSTEM MEMORY SIZE

FIELD OF THE INVENTION

The invention relates in general to computer databases, and in particular to data mining. The invention specifically relates to an efficient method and system for generating a decision-tree classifier from data records independent of the memory size of the system generating the classifier.

BACKGROUND OF THE INVENTION

Data mining is an emerging application of computer databases that involves the development of tools for analyzing large databases to extract useful information from them. As an example of data mining, customer purchasing patterns may be derived from a large customer transaction database by analyzing its transaction records. Such purchasing habits can provide valuable marketing information to retailers in displaying their merchandise or controlling the store inventory. Other applications of data mining include fraud detection, store location search, and medical diagnosis.

Classification of data records according to certain classes of the records is an important part of data mining. In classification, a set of example records, referred to as a training set or input data, is provided from which a record classifier will be built. Each record of the training set consists of several attributes where the attributes can be either numeric or categorical. Numeric (or continuous) attributes are those from an ordered domain, such as employee age or employee salary. Categorical attributes are those from an unordered domain such as marital status or gender. One of these attributes, called the classifying attribute, indicates the class to which the record belongs. The objective of classification is to build a model of the classifying attribute, or classifier, based upon the other attributes. Once the classifier is built, it can be used to determine the class of future records.

Classification models have been studied in the fields of statistics, neural networks, and machine learning. They are described, for example, in "*Computer Systems that Learn: Classification and Prediction Methods from Statistics,*" S. M. Weiss and C. A. Kulikowski, 1991. Prior art classification methods, however, lack scalability and usually break down in cases of large training datasets. They commonly require the training set to be sufficiently small so that it would fit in the memory of the computer performing the classification. This restriction is partially due to the relatively small number of training examples available for the applications considered by the prior art methods, rather than for data mining applications. Early classifiers thus do not work well in data mining applications.

In the paper "*An Interval Classifier For Database Mining Applications,*" Proc. of the Very Large Database Conference, August 1992, Agrawal et al. described a classifier specially designed for database applications. However, the focus there was on a classifier that can use database indices to improve retrieval efficiency, and not on the size of the training set. The described classifier is therefore not suitable for most data mining applications, where the training sets are large.

Another desirable property of classifiers is their short training time, i.e., the time required to generate a classifier from a set of training records. Some prior art methods address both the execution time and memory constraint problems by partitioning the data into subsets that fit in the system memory and developing classifiers for the subsets in parallel. The output of these classifiers is then combined using various algorithms to obtain the final classification. Although this approach reduces running time significantly, studies have shown that the multiple classifiers do not achieve the same level of accuracy of a single classifier built using all the data. See, for example, "*Experiments on Multistrategy Learning by Meta-Learning,*" by P. K. Chan and S. J. Stolfo, Proc. Second Intl. Conf. on Information and Knowledge Management, pp. 314–323, 1993.

Other prior art methods classify data in batches. Such incremental learning methods have the disadvantage that the cumulative cost of classifying data incrementally can sometimes exceed the cost of classifying all of the training set once. See, for example, "*Megainduction: Machine Learning on Very Large Databases,*" Ph.D. Thesis by J. Catlett, Univ. of Sydney, 1991.

Still other prior art classification methods, including those discussed above, achieve short training times by creating the classifiers based on decision trees. A decision tree is a class discriminator that recursively partitions the training set until each partition consists entirely or dominantly of records from the same class. The tree generally has a root node, interior nodes, and multiple leaf nodes where each leaf node is associated with the records belonging to a record class. Each non-leaf node of the tree contains a split point which is a test on one or more attributes to determine how the data records are partitioned at that node. Decision trees are compact, easy to understand and to be converted to classification rules, or to Structured Query Language (SQL) statements for accessing databases.

Figure 1:
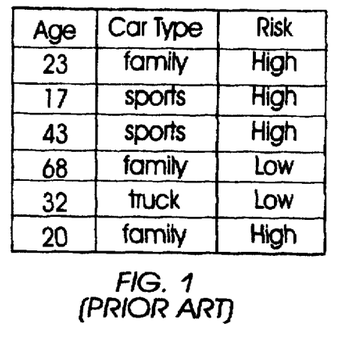
FIG. 1 shows an example of a prior art training set of records.
Figure 2:
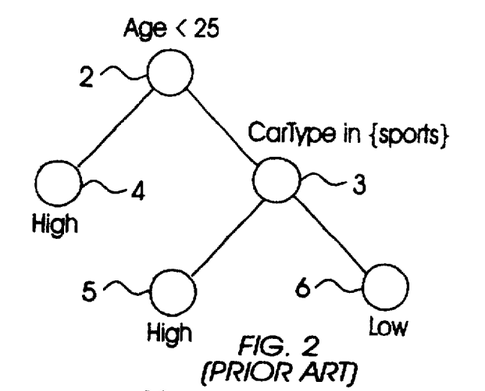
FIG. 2 illustrates a prior art decision tree corresponding to the training set of FIG. 1 in which each leaf node represents a class of records.

For example, FIG. 1 shows a training set where each record represents a car insurance applicant and includes three attributes: Age, Car Type, and Risk level. FIG. 2 shows a prior art decision-tree classifier created from the training records of FIG. 1. Nodes 2 and 3 are two split points that partition the records based on the split tests (Age<25) and (Car Type in {Sports}), respectively. The records of applicants whose age is less than 25 years belong to the High Risk class associated with node 4. The records of those older than 25 years but have a sport car belong to the High Risk class associated with node 5. Other applicants fall into the Low risk class of node 6. The decision tree then can be used to screen future applicants by classifying them into the High or Low Risk categories.

As another example of decision-tree classifiers, an efficient method for constructing a scalable, fast, and accurate decision-tree classifier is described in the assignee's pending application "Method and System For Generating a Decision-Tree Classifier For Data Records," Ser. No. 08/564,694 (hereinafter '694 application). The method described there effectively handles disk-resident data that is too large to fit in the system memory by presorting the records, building the tree branches in parallel, and pruning the tree using the Description Length (MDL) principle. Further, it forms a single decision tree using the entire training set, instead of combining multiple classifiers or partitioning the data. For more details on MDL pruning, see for example, "*MDL-based Decision Tree Pruning,*" Intl. Conf. on Knowledge Discovery in Databases and Data Mining, pp. 216–221, 1995.

A major drawback of the method described in the '694 application is that it requires some data per record to stay memory-resident all the time. For instance, the method uses a class list having attribute values and node IDs to indicate the node to which a particular record belongs. The class list is regularly updated as the records are partitioned to create new nodes and needs to be memory-resident for efficient processing. Since the size of this class list grows in direct proportion to the number of input records, this places a limit on the amount of data that can be classified that depends on the size of the system memory.

Therefore, there remains a need for an efficient method for generating a compact decision-tree classifier that is fast, scalable on large training sets, and not limited by the system memory size.

SUMMARY OF THE INVENTION

It is an object of the present invention to provide an efficient method for generating a decision-tree classifier from a training set of records, independent of the system memory size, for classifying future records of unknown classes.

Another object of the present invention is to obtain a decision-tree classifier that is compact, accurate, and has short training times.

Still another object of the present invention is a method for generating a classifier that is scalable on large disk-resident training sets.

The present invention achieves the foregoing and other objects by providing a method for generating a decision-tree classifier from a training set of records. Each record includes one or more attributes, a class label to which the record belongs, and a record ID. In accordance with the invention, the method includes a step of generating an attribute list for each attribute of the training records. Each entry in the attribute list includes a value of that attribute, and the class label and record ID of the record from which the attribute value came from. The attribute lists for numeric attributes are sorted based on attribute value. A decision tree is then generated by repeatedly partitioning the records according to record classes, using the attribute lists. The final decision tree becomes the desired classifier in which the records associated with each leaf node are of the same class.

The decision tree is created by repeatedly splitting the records at each examined node, starting with the root node. At any examined node, a split test is determined to best separate the records at that node by record class, using the attribute lists. The node's records are split according to the best split test into partitions of records to form child nodes of the examined node, which also become new leaf nodes of the tree. This splitting process continues for the new leaf nodes until each leaf node contains records of a single class. Preferably, the split tests are determined based on a splitting index corresponding to the criterion used in splitting the records. The index may be a gini index based on the relative frequency of records from each class present in the training set.

In addition, for each attribute, each leaf node includes one or more variables, such as histograms, representing the distribution of the records at that leaf node. In determining a split test, the attribute list for each attribute A is scanned. For each value v of A in the attribute list, the class histograms for A at the examined node are updated using the class label corresponding to v and the value v. If A is a numeric attribute, then the splitting index for the splitting criterion (A<=v) for the examined node is calculated. If A is categorical, then a subset of the attribute A resulting in the highest splitting index for the examined node is determined.

The desired subset of A is determined by considering various subsets of a set S of all A values as possible split points. If the number of values of A is less than a certain threshold, then all subsets of the set S are evaluated to find one with the highest splitting index for the examined node. If the number of values is equal to or more than the threshold, each value of A from the set S is added, one at a time, to an initially empty set S' to find a split with the highest splitting index.

In accordance with the invention, the partitioning of records at each node includes, for an attribute B used in the respective split test, dividing the attribute list for B into new attribute lists corresponding respectively to the child nodes of the examined node. In dividing the attribute list, the method traverses the list to apply the split test to each entry in the list and puts the entry into a respective new list according to the test. In addition, a hash table is created with the record IDs from the attribute list as the list is being divided, which is then used for splitting the remaining attribute lists of the examined node among its child nodes. The method also updates the histograms of the child nodes with the distributions of records at these nodes.

In another aspect of the invention, the originally created decision tree is pruned based on the MDL principle to obtain a more compact classifier. The original tree and split tests are first encoded in a MDL-based code. The code length for each node of the tree is calculated. Depending on the code lengths resulting from alternative pruning options at the node, the method determines whether to prune the node, and if so, how to prune it.

In a first embodiment of the pruning step, each node of the decision tree is encoded using one bit. If the code length in the case the node has no child node is less than when it has both child nodes, then both of its child nodes are pruned and the node becomes a leaf node. Otherwise, the node is left intact.

In a second embodiment, two bits are used to encode each node of the tree. The code length is evaluated for the cases where the node is a leaf node, has a left child, has a right child, and has both child nodes. A pruning option is selected from these cases such that the shortest code length for the node is obtained.

In a third embodiment of the pruning step, a smaller tree is first obtained using the steps of the first embodiment. The smaller tree is further pruned by examining the code length of each node for the cases where the node has only a left child, only a right child, and both child nodes. A pruning option is selected so that the shortest code length for the node is obtained.

Additional objects and advantages of the present invention will be set forth in the description which follows, and in part will be obvious from the description and with the accompanying drawing, or may be learned from the practice of this invention.

DESCRIPTION OF THE PREFERRED EMBODIMENT

The invention is primarily described as a method for generating a decision-tree classifier from a training set of records, independent of the memory size of the system performing the method. However, persons skilled in the art will recognize that an apparatus, such as a data processing system, including a CPU, memory, I/O, program storage, a connecting bus, and other appropriate components, could be programmed or otherwise designed to facilitate the practice of the method of the invention. Such a system would include appropriate program means for executing the method of the invention.

Also, an article of manufacture, such as a pre-recorded disk or other similar computer program product, for use with a data processing system, could include a storage medium and program means recorded thereon for directing the data processing system to facilitate the practice of the method of the invention. Such apparatus and articles of manufacture also fall within the spirit and scope of the invention.

Figure 3:
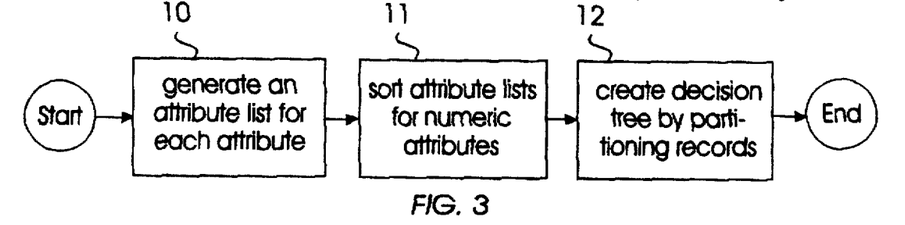
FIG. 3 is a flow chart showing the overall operation of the method of the present invention.

FIG. 3 illustrates a high-level flow chart of the method for generating a decision-tree classifier from a training set of records, in accordance with the invention. Each record has one or more data attribute values, a class label of the class to which the record belongs, and a record ID. An attribute may be numeric (or continuous) such as Age, or categorical such as Car Type. Beginning with block 10, the method generates an attribute list for each attribute of the records. Each entry in an attribute list has an attribute value, class label, and record ID of the record from which the attribute value is obtained. The attribute lists are described in more detail below in accordance with FIGS. 5 and 6.

At block 11, the attribute lists for numeric attributes are sorted based on attribute value. By initially sorting the numeric attribute lists once, future attribute lists created from the original lists will not need to be sorted again during the evaluation of split tests at each leaf node. A decision tree is next generated by repeatedly partitioning the records using the attribute lists, as shown by block 12. The algorithm for generating the decision tree is described further below in reference to FIGS. 7 through 16. The resulting decision tree after all record classes are identified becomes the decision-tree classifier.

Figure 4:
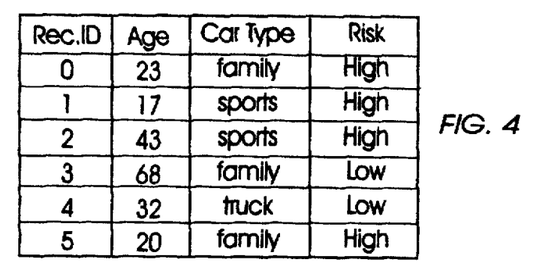
FIG. 4 illustrates an exemplary training set of records for use with the method of the invention.
Figure 5:
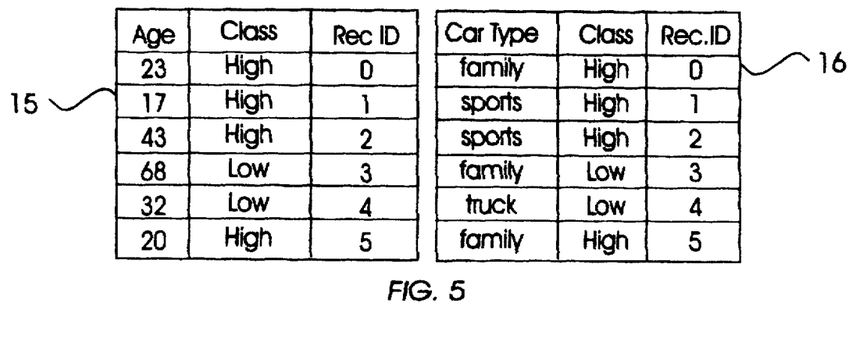
FIG. 5 illustrates the attribute lists generated by the system, according to block 10 of FIG. 3.
Figure 6:
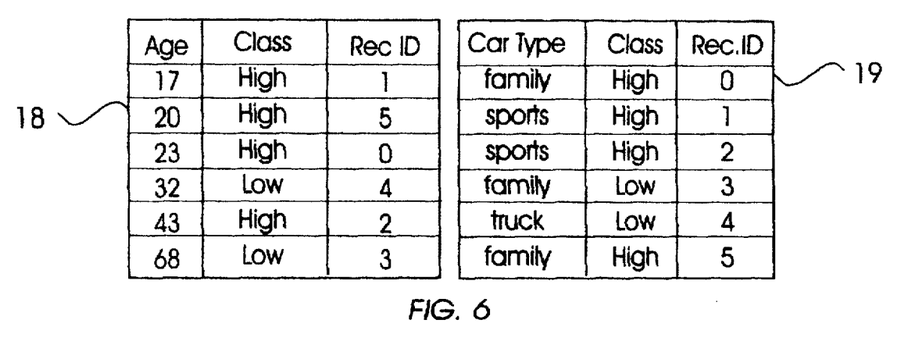
FIG. 6 shows the attribute lists from FIG. 5 after the attribute list for the numeric attribute is sorted, according to block 11 of FIG. 3.

FIG. 4 illustrates an example of a training set of records for use with the method of the invention. Each record represents a car insurance applicant with the values of two attributes Age and Car Type, and a class label indicating the Risk level for the applicant. In this case, Age is a numeric attribute indicating the applicant's age, while Car type is a categorical attribute indicating the type of the applicant's car. FIG. 5 represents the attribute lists generated from the training records of FIG. 4, according to block 10 of FIG. 3. The attribute lists 15 and 16 correspond respectively to the numeric attribute Age and categorical attribute Car Type. FIG. 6 shows the same attribute lists from FIG. 5 after the attribute list 18 for the numeric attribute Age has been sorted, in accordance with block 11 of FIG. 3.

GENERATING THE DECISION TREE

Figure 7:
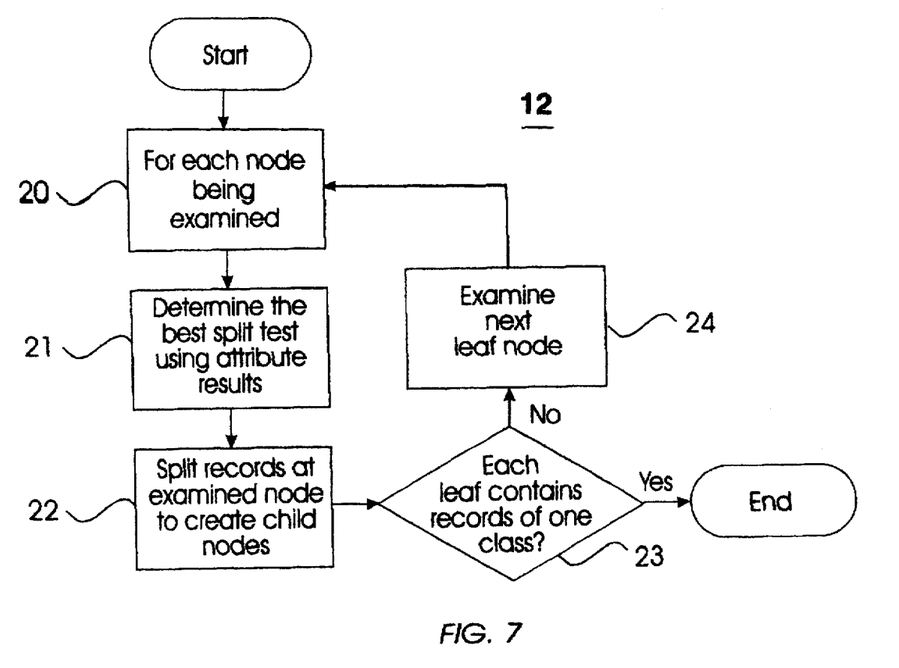
FIG. 7 is a flow chart showing further details for the step of creating the decision tree, from block 12 of FIG. 3.

FIG. 7 illustrates a high-level flowchart for the step of generating a decision tree from the records and attribute lists, from block 12 of FIG. 3. Generally, the method recursively examines each leaf node to determine a split point that best separates the records at the node by record class. The partitions of records form new leaf nodes of the tree. This process continues until the records at each leaf node are entirely or dominantly from the same class. Note that initially, the tree is viewed as having a single leaf node that is also the root node.

Starting with block 20, for each leaf node being examined, the method determines a split test to best separate the records at the examined node using the attribute lists, as shown by block 21. The determination of the split tests is described further below. At block 22, the records at the examined leaf node are partitioned according to the best split test at that node to form new leaf nodes, which are also child nodes of the examined node. The records at each new leaf node are checked at block 23 to see if they are of the same class. If this condition has not been achieved, the splitting process is repeated starting with block 24 for each newly formed leaf node until each leaf node contains records from one class.

In finding the best split test (or split point) at a leaf node, a splitting index corresponding to a criterion used for splitting the records may be used to help evaluate possible splits. This splitting index indicates how well the criterion separates the record classes. Although various indices are may be used, the splitting index is preferably a gini index as described, for example, by Brieman et al. in "*Classification and Regression Trees*, Wadsworth, 1984. For a data set T containing records from n classes, the gini index gini(T) is defined as $$gini(T) = 1 - \Sigma p_j^2$$

where $p_j$ is the relative frequency of class j in the data set T. Therefore, if a split divides T into two subsets, $T_1$ and $T_2$, having $n_1$ and $n_2$ records, respectively, the index of the divided data $gini_{(split)}(T)$ is given by $$gini_{(split)}(T) = \frac{n_1}{n} gini(T_1) + \frac{n_2}{n} gini(T_2)$$

The advantage of the gini index is that its calculation requires only the distribution of the class values in each record partition. To find the best split point for a node, the node's attribute lists are scanned to evaluate the splits for the attributes. The attribute containing the split point with the lowest value for the gini index is used for splitting the node's records.

Figure 8:
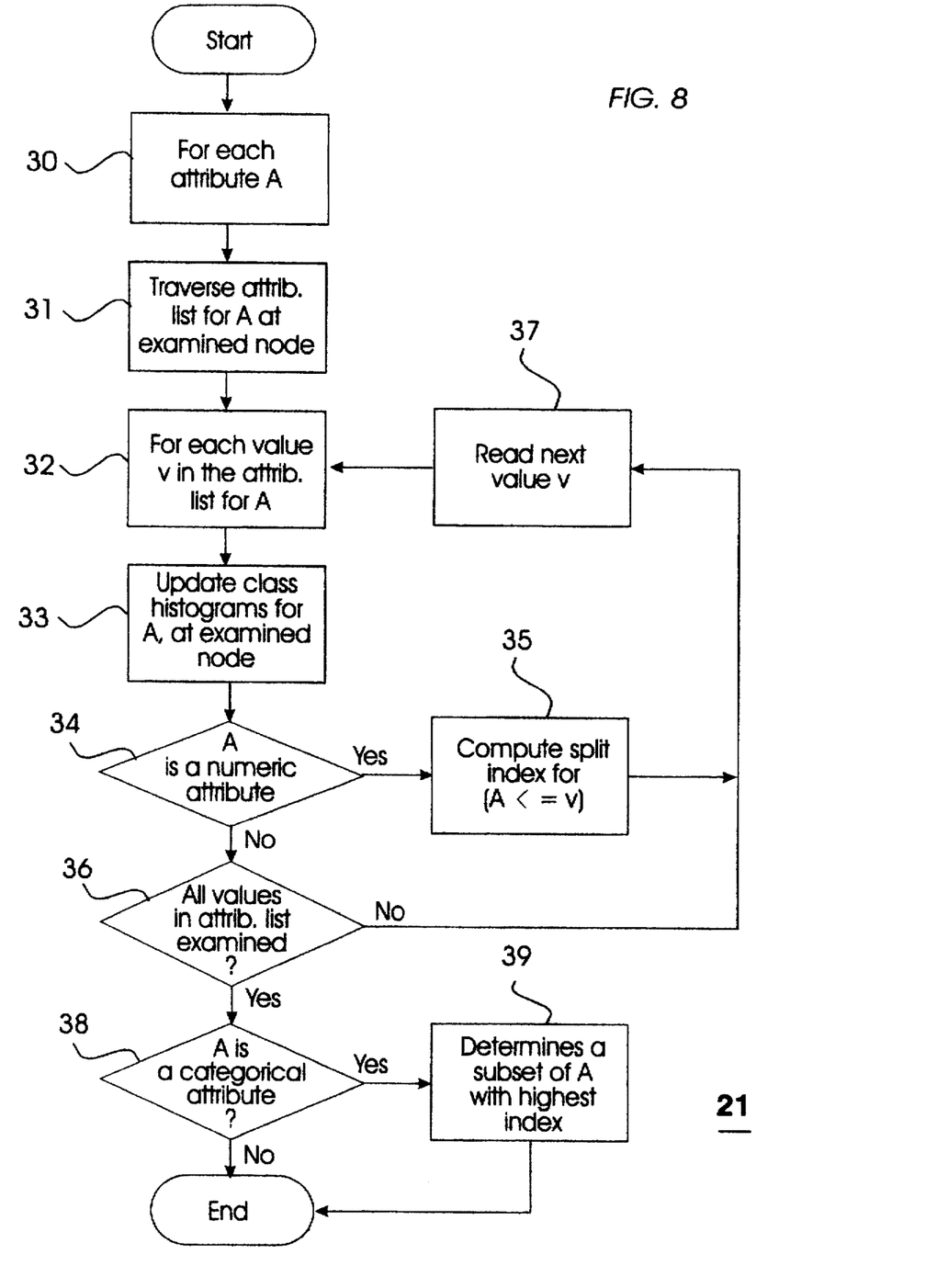
FIG. 8 is a flow chart showing further details for the step of determining a split test at each examined node, from block 21 of FIG. 7.

FIG. 8 shows further details for the step of determining a split test from block 21 of FIG. 7. To help evaluate the split tests, a variable indicating the distribution of records by record class at each leaf node may be used. For example, each leaf node may have a histogram for each categorical attribute showing the class distribution of the records at that node. For a numeric attribute, two histograms $C_{below}$ and $C_{above}$ are typically maintained that are initialized respectively to zero and the distribution for all the records at the leaf node.

Starting with block 30 of FIG. 8, the attribute list for each attribute A at the examined node is traversed, as shown in block 31. For each value v in the attribute list, the class histograms for A at the examined node are updated with the class label corresponding to v and the value v, as shown by block 33. If A is determined in block 34 to be numeric, the splitting index for the splitting criterion (A≦v) at the examined node is computed at block 35. Another attribute value v is then examined, at block 37, until the complete list is traversed, at block 36. If A is a categorical attribute, the method determines in block 39 a subset of the attribute A would that result in the highest splitting index for the examined node. The determination of this subset is further described below in reference to FIG. 11.

Figure 9A:
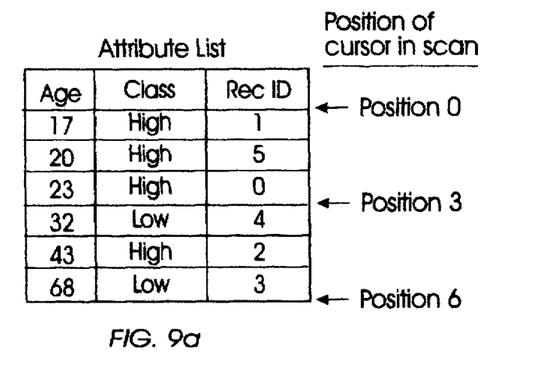
FIGS. 9a and 9b illustrate a numeric attribute list and the state of the class histograms corresponding to three exemplary locations in the attribute list while the list is being traversed, according to block 31 of FIG.8.
Figure 9B:
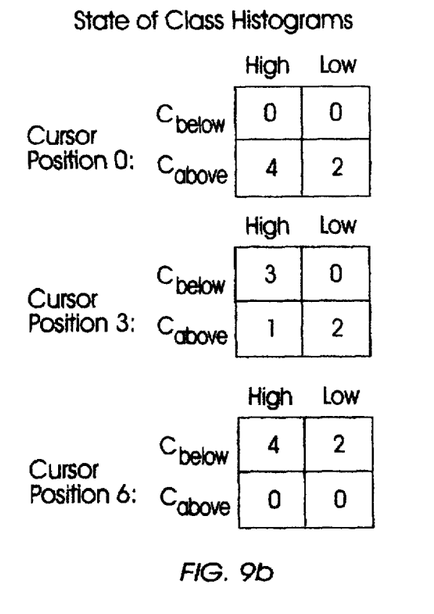

FIGS. 9a and 9b illustrate how the histograms for the numeric attribute Age are updated according to block 33 of FIG. 8. In FIG. 9a, the attribute list for Age from FIG. 6 is shown again with three illustrative cursor positions while the list is being traversed per block 31 of FIG. 8. FIG. 9b shows the state of the $C_{below}$ and $C_{above}$ histograms for the attribute Age that correspond to the three cursor positions of FIG. 9a, after the histograms are updated according to block 33 of FIG. 8.

Figure 10A:
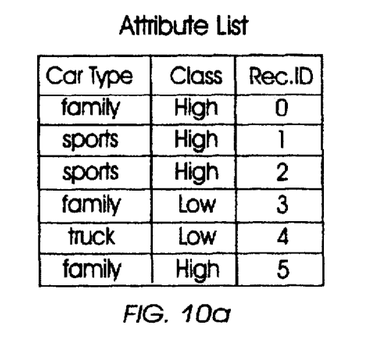
FIGS. 10a and 10b illustrate a categorical attribute list and the corresponding histogram, according to block 31 of FIG. 8.
Figure 10B:
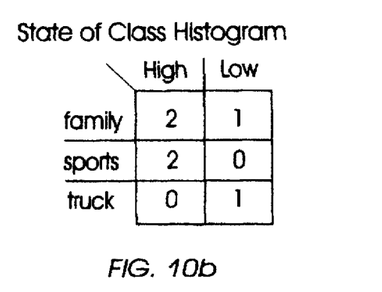

Similarly, FIGS. 10a and 10b illustrate the attribute list for the categorical attribute Car Type and its corresponding histogram (or count matrix). In FIG. 10a, the attribute list for Car Type is reproduced from FIG. 6. The histogram for Car Type is shown in FIG. 10b after it is updated according to block 33 of FIG. 8.

Figure 11:
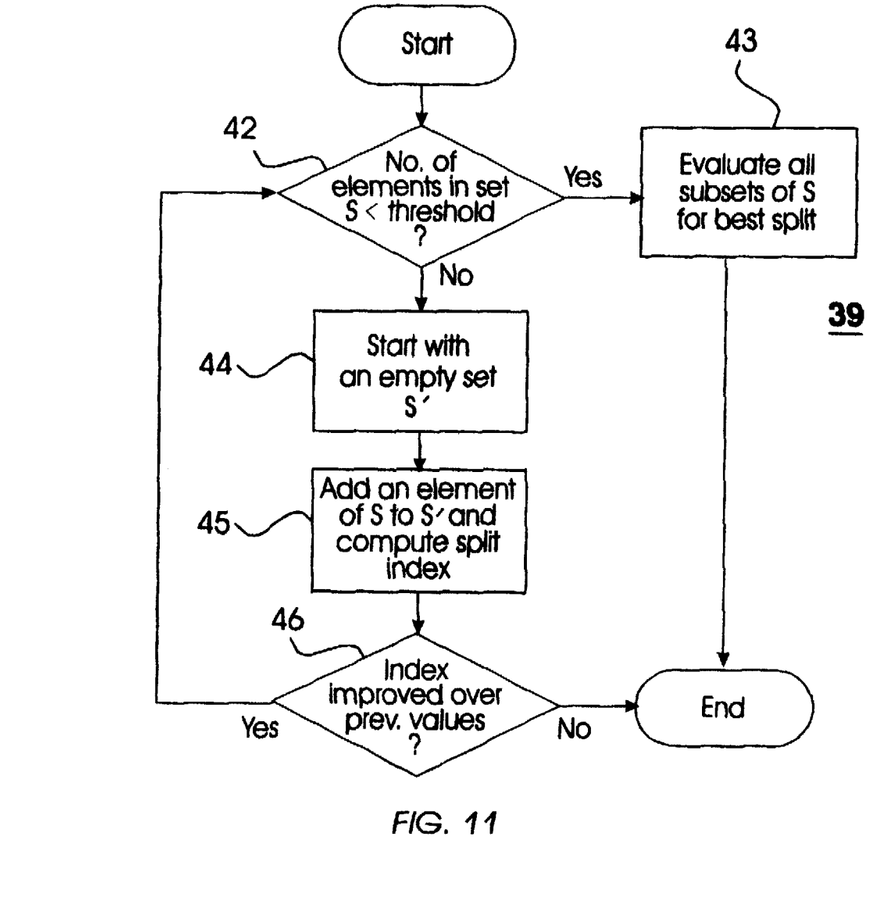
FIG. 11 is a flow chart showing further details for the step of determining a subset of the attribute values with the highest splitting index, from block 39 of FIG. 8.

Referring now to FIG. 11, a preferred embodiment for block 39 of FIG. 8, for determining a subset of a categorical attribute A with the highest splitting index, is shown in the form of a flow chart. The splits for a categorical attribute A are of the form A∈S', where S'⊂S and S is the set of all possible values of the attribute A. Since the evaluation of all the subsets of S can be prohibitively expensive, especially if the number of elements in S (the cardinality of S) is large, the method uses a hybrid approach where it only evaluates all the subsets of S if the cardinality of S is less than a certain threshold.

Starting with block 42, the cardinality of the set S is compared to the predetermined threshold. If the cardinality is less than the threshold, then all the subsets of S are evaluated to find the best split for the records, at block 43. Otherwise, a greedy algorithm may be used for subsetting. For instance, starting with an empty set S' at block 44, each element of set S is added to S', one at a time, and a corresponding splitting index is computed at block 45. This incremental addition to S' continues until there is no further improvement in the splitting index, as determined at block 46.

Figure 12:
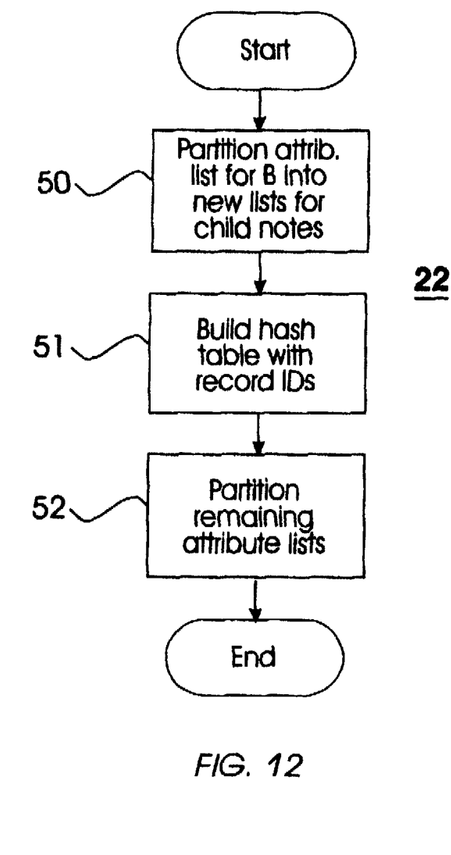
FIG. 12 is a flow chart showing further details for the step of splitting the records at a node to create child nodes, from block 22 of FIG. 7.

Referring now to FIG. 12, further details for the step of splitting the records, per block 22 of FIG. 7, are shown. At block 50, the attribute list for an attribute B used in the split test is partitioned into new attribute lists, one for each child node of the examined node. Typically, the method traverses the attribute list, applies the split test to each entry in the list, and puts the entry into a respective new list according to the test result. Also, a hash table is created in block 51 using the record IDs from the entries of the attribute list for B as the entries are distributed among the new attribute lists. Based on this hash table, the remaining attribute lists at the examined node are partitioned among the child nodes of the examined node, as shown by block 52.

Figure 13:
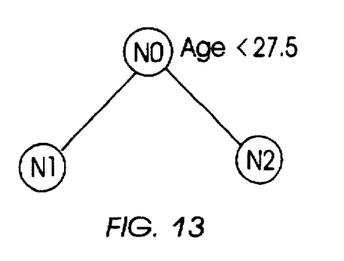
FIG. 13 illustrates a decision tree being created as the records at node N0 are split to form child nodes N1 and N2, according to block 22 of FIG. 7.
Figure 14:
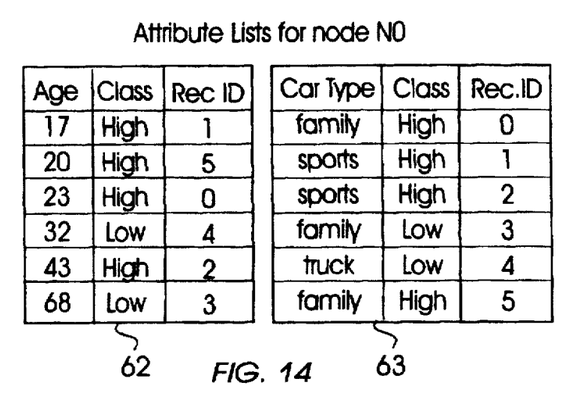
FIG. 14 shows the attribute lists corresponding to node N0 shown in FIG. 13, which are the same as the original attribute lists illustrated in FIG. 6.
Figure 15:
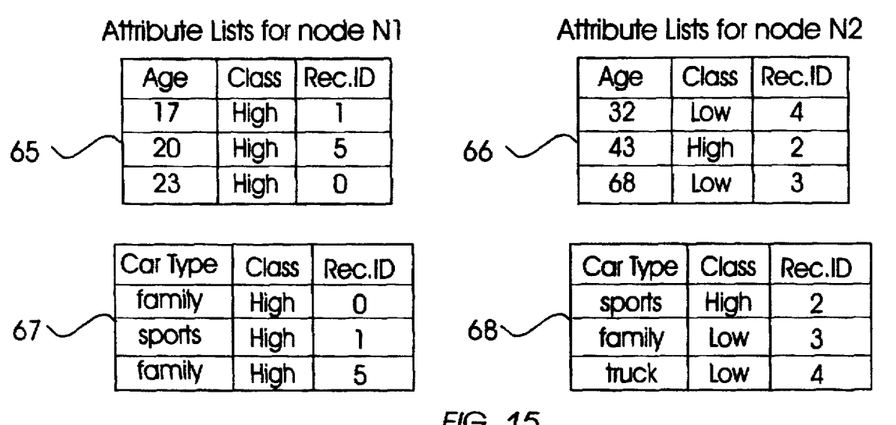
FIG. 15 shows how the attribute lists of the node N0 are partitioned into new attribute lists for its child nodes N1 and N2, according to blocks 50 and 52 of FIG. 12.
Figure 16:
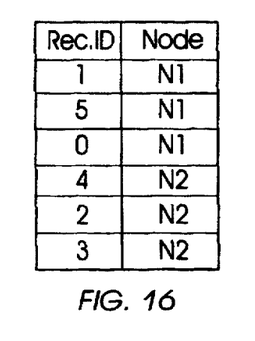
FIG. 16 illustrates a typical hash table created according to block 51 of FIG. 12.

FIGS. 13–16 illustrate how a node's attribute lists are partitioned into new attribute lists for its child nodes, according to the steps described in reference to FIG. 12. FIG. 13 shows a node N0 and its two child nodes N1 and N2 generated by the split test (Age<27.5). As an example, assume that the records at node N0 are the same as those in FIG. 4. The attribute lists at node N0 are therefore the same as those in FIG. 6 and are reproduced in FIG. 14. The attribute lists for the child nodes N1 and N2 are shown in FIG. 15. The Age attribute lists 65 and 66 correspond respectively to nodes N1 and N2, and are created when the attribute list 62 of FIG. 14 is partitioned per block 50 of FIG. 12. The Car Type attribute lists 67 and 68 correspond to nodes N1 and N2, respectively, and are created when the attribute list 63 is partitioned per block 52 of FIG. 12. A typical hash table formed according to block 51 of FIG. 12 is shown in FIG. 16.

PRUNING THE DECISION TREE

In order to obtain a compact classifier, the decision tree as created may further be pruned to remove extraneous nodes. Preferably, the pruning algorithm is based on the Minimum Description Length (MDL) principle so that a subset of the child nodes at each node may be discarded without over-pruning the tree. The pruning step is illustrated in more detail in FIGS. 17 through 20.

The MDL principle generally states that the best model for encoding data is one that minimizes the sum of the cost of describing the data in terms of the model and the cost of describing the model. If M is a model that encodes data D, the total cost of encoding, cost(M, D), is defined as:

$$cost(M, D) = cost(D|M) + cost(M)$$

where the cost of encoding X, cost(X), is defined as the number of bits required to encode X. Here, the models are the set of trees obtained by pruning the original decision tree $T_M$, and the data is the training set $S_D$. Since the cost of encoding the data is relatively low, the objective in MDL pruning will be to find a subtree of the tree $T_M$ that best describes the training set $S_D$.

The cost of encoding the model includes the cost of describing the tree and the costs of describing the split tests used at the internal nodes of the tree. Given a decision tree, each node can be an internal node with one or two children, or a leaf node. The number of bits required to encode the tree depends on the permissible tree structures. For instance, if a node is allowed to have either zero or two child nodes, it takes only one bit to encode each node since there are two possibilities. If each node can have no children, a left child, a right child, or both children, then two bits are needed to encode the four possibilities. In the case where only internal nodes are examined, i.e., each node can have a left child, a right child, or both children, then log(3) bits are required. Note that the convenient practice of assuming partial bits in arithmatic coding is used in this case.

For the split tests, the encoding costs are different depending on whether the split attribute is numeric or categorical. If A is a numeric attribute, the split tests are typically of the form $A \leq v$ where v is a real-valued number. The cost of encoding the split test $A \leq v$ is simply the overhead of encoding the value v. In the case where A is a categorical attribute, the split tests are of the form $A \in S'$, where S' is a subset of the possible values of A. The cost of the split test using the attribute A is $\ln(n_A)$ where $n_A$ is the number of such test used in the tree.

Figure 17:
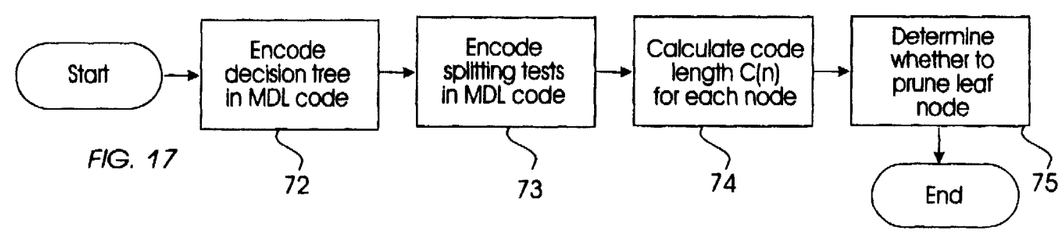
FIG. 17 is a flow chart showing the steps for pruning the decision tree based on the Minimum Description Length principle to obtain the final decision-tree classifier.

Referring now to FIG. 17, a typical pruning of the decision tree based on the MDL principle is shown. It consists of two main phases: (a) encoding the tree and (b) determining whether to prune the tree and how it is pruned, based on the cost of encoding. First, at block 72, the tree is encoded in a MDL-based code. The preferred encoding methods are described below in reference to FIGS. 18, 19, and 20. The split tests for the leaf nodes are also encoded with the MDL-based code, as shown by block 73. Next, for each node n of the tree, a code length C(n) for the node is computed in block 74 for each pruning option, and evaluated in block 75 to determine whether to convert the node into a leaf node, to prune its left or right child node, or to leave the node n intact.

The code length C(t) for the test options at a node n is calculated as follows:

(i)  $C_{leaf}(t) = L(t) + \text{Errors}_t$, if t is a leaf node (Option 1)

(ii) $C_{both}(t) = L(t) + L_{test} + C(t_1) + C(t_2)$, if t has both child nodes (Option 2)

(iii) $C_{left}(t) = L(t) + L_{test} + C(t_1) + C'(t_2)$, if t has only child node $t_1$ (Option 3); and (iv) $C_{right}(t) = L(t) + L_{test} + C(t_1) + C(t_2)$, if t has only child node $t_2$ (Option 4), where $L_{test}$ is the cost of encoding any test at an internal node, L(t) is the cost of encoding the node itself, Errors, represents the misclassification errors at the node, $C(t_j)$ is the cost of encoding the $l^{th}$ subtree, and $C'(t_j)$ is the cost of encoding a child node's records using the parent node's statistics.

Figure 18:
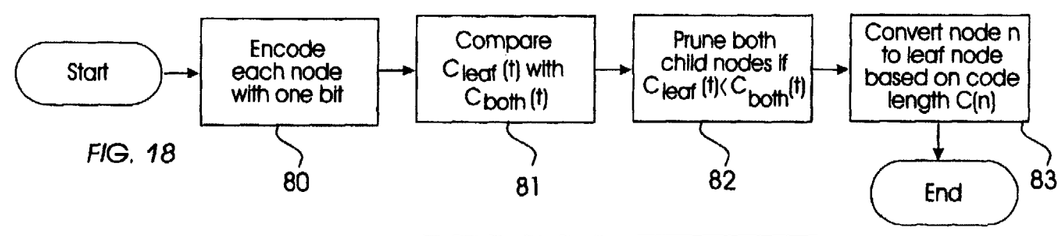
FIG. 18 is a flow chart showing the Full pruning embodiment for the pruning steps of FIG. 17.
Figure 19:
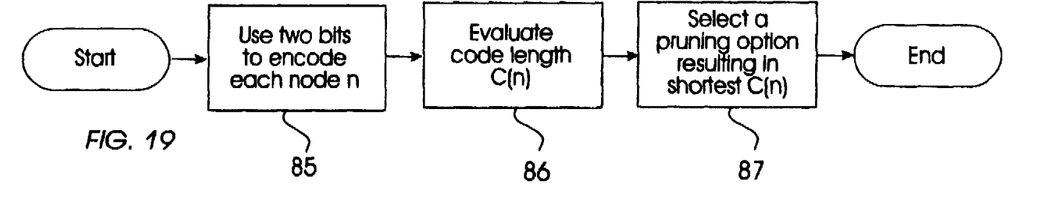
FIG. 19 is a flow chart showing the Partial pruning embodiment for the pruning steps of FIG. 17.
Figure 20:
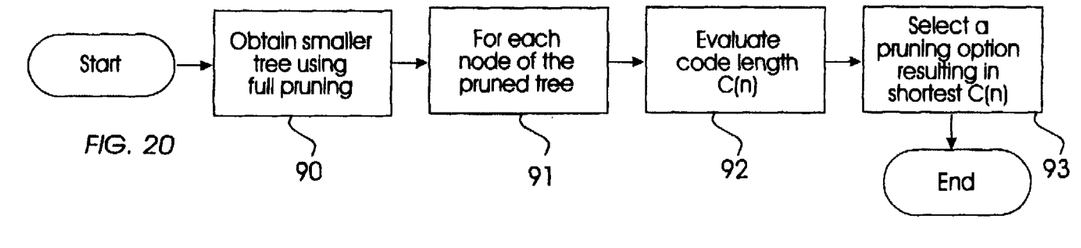
FIG. 20 is a flow chart showing the Hybrid pruning embodiment for the pruning steps of FIG. 17.

In FIGS. 18 through 20, the flow charts for the preferred embodiments of the step of pruning from FIG. 17 are shown. The embodiment in FIG. 18 is referred to as Full pruning and is used when a node may have zero or two child nodes (options 1 and 2). Accordingly, only one bit is needed to encode each node of the tree, as shown by block 80. At block 81, the code length $C_{leaf}(t)$ when the node has no child nodes is compared to the code length $C_{both}(t)$ when it has both child nodes. If $C_{leaf}(t)$ is less than $C_{both}(t)$, both child nodes of the test node are pruned and the node is converted into a leaf node, as shown by blocks 82 and 83.

FIG. 19 shows another embodiment of the step of pruning from FIG. 17, referred to as Partial pruning. Partial pruning is desirable where all four options are applicable to each tree node, i.e., the node may be a leaf node, have only a left child node or a right child node, or have both child nodes. At block 85, two bits are used to encode each node n of the decision tree. The code lengths for the four options are evaluated at block 86 and the option with the shortest code length for node n is selected at block 87.

Finally, FIG. 20 shows a third preferred embodiment of the pruning step from FIG. 17 that combines Full pruning and Partial pruning, and is appropriately referred to as Hybrid pruning. The Hybrid method prunes the decision tree in two phases. At block 90, it first uses Full pruning to obtain a smaller tree from the originally generated tree. It then considers only options 2, 3, and 4, i.e., where the node has a left child, a right child, or both, to further prune the smaller tree. Since there are three options at each node, log(3) bits are used for encoding the node. Finally, at blocks 91 and 92, for each node of the smaller tree, the code lengths corresponding to the three options are evaluated to select a pruning option that results in the shortest code length for the node, as shown by block 93.

Based on the foregoing specification, the invention may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the invention. The computer readable media may be, for instance, a fixed (hard) drive, diskette, optical disk, magnetic tape, semiconductor memory such as read-only memory (ROM), etc., or any transmitting/receiving medium such as the Internet or other communication network or link. The article of manufacture containing the computer code may be made and/or used by executing the code directly from one medium, by copying the code from one medium to another medium, or by transmitting the code over a network.

An apparatus for making, using, or selling the invention may be one or more processing systems including, but not limited to, a central processing unit (CPU), memory, storage devices, communication links, communication devices, servers, I/O devices, or any sub-components or individual parts of one or more processing systems, including software, firmware, hardware or any combination or subset thereof, which embody the invention as set forth in the claims.

User input may be received from the keyboard, mouse, pen, voice, touch screen, or any other means by which a human can input data to a computer, including through other programs such as application programs.

One skilled in the art of computer science will easily be able to combine the software created as described with appropriate general purpose or special purpose computer hardware to create a computer system or computer sub-component embodying the invention and to create a computer system or computer sub-component for carrying out the method of the invention.

While several preferred embodiments of the invention have been described, it should be apparent that modifications and adaptations to those embodiments may occur to persons skilled in the art without departing from the scope and the spirit of the present invention as set forth in the following claims.

We claim:

1. A method for generating a decision-tree classifier from a training set of records, each record having: (i) at least one attribute, each attribute having a value, (ii) a class label of the class to which the record belongs, and (iii) a record ID, the method comprising the steps of:

generating an attribute list for each attribute of the records, each entry in the attribute lists having the attribute value, class label, and record ID of the record from which the attribute value is obtained;

sorting the attribute lists for numeric attributes based on attribute values; and creating a decision tree by repeatedly partitioning the records using the attribute lists, the resulting decision tree becoming the decision-tree classifier.

2. The method as recited in claim 1, wherein the attributes include categorical attributes.

3. The method as recited in claim 1, wherein:

the decision tree includes a root node, a plurality of interior nodes, and a plurality of leaf nodes, all of the records initially belonging to the root node; and the step of creating a decision tree includes the steps, executed for each node being examined until each leaf node of the decision tree contains records from only one class, of:

a) determining a split test to best separate the records at the examined node by record classes, using the attribute lists; and b) splitting the records of the examined node according to the split test at the examined node to create child nodes of the examined node, the child nodes becoming new leaf nodes.

4. The method as recited in claim 3, wherein the step of determining a split test is based on a splitting index corresponding to a criterion for splitting the records.

5. The method as recited in claim 4, wherein the splitting index includes a gini index based on relative frequencies of records from each record class present in the training set.

6. The method as recited in claim 4, wherein:

each leaf node includes, for each attribute of the records at the leaf node, a plurality of histograms representing the class distribution of the records at the leaf node; and the step of determining a split test includes the steps of:

a) for each attribute A, traversing the attribute list for A at the examined node;

b) for each value v of A in the attribute list for A:

i) updating the class histograms for A, at the examined node, with the class label corresponding to v and the value v; and ii) if the attribute A is numeric, then computing the splitting index corresponding to splitting criterion (A<=v) for the examined node; and c) if the attribute A is categorical, then determining a subset of the attribute A that results in the highest splitting index for the examined node.

7. The method as recited in claim 6, wherein the histograms for each numeric attribute include a $C_{below}$ histogram and a $C_{above}$ histogram, the $C_{below}$ histogram corresponding to the class distribution of the entries in the attribute list for A that precede the value v, and the $C_{above}$ histogram corresponding to the class distribution of the entries in the attribute list for A that include the value v and those following the value v.

8. The method as recited in claim 6, wherein the step of determining a subset of the attribute A includes the steps of:

if a number of elements in a set S of all values of A is less than a predetermined threshold, then evaluating all subsets of the set S to find one with the highest splitting index; and if the number of elements in S is equal to or more than the predetermined threshold, then:

a) adding an element of S to an initially empty subset S' of S such that the splitting index for the splitting criterion at the examined node is maximized; and b) repeating the step of adding until there is no improvement in the splitting index.

9. The method as recited in claim 3, wherein the step of splitting the records includes the steps of:

partitioning the attribute list for an attribute B used in the split test into new attribute lists corresponding, respectively, to the child nodes of the examined node;

building a hash table with the record IDs from the entries of the attribute list for B as the entries are partitioned among the new attribute lists; and partitioning the remaining attribute lists of the examined node among the newly created child nodes according to the hash table.

10. The method as recited in claim 9, wherein the step of partitioning the attribute list includes the steps of:

traversing the attribute list for the attribute B;

applying the split test to each entry of the attribute list for B; and entering the entry into a respective new attribute list according to the split test.

11. The method as recited in claim 9, wherein the step of creating a decision tree further comprises the step of updating the histograms for each newly created child node with the distribution of records at the child node.

12. The method as recited in claim 3 further comprising the step of pruning the decision-tree classifier to obtain a more compact classifier.

13. The method as recited in claim 12, wherein:

the step of pruning is based on a Minimum Description Length (MDL) principle that encodes the decision tree as a model such that an encoding cost for describing the decision tree and the training set is minimized;

the step of pruning includes the steps of:

encoding the decision tree in an MDL-based code;

encoding the split tests for the leaf nodes in the MDL-based code;

calculating a code length C(n) for each node n of the decision tree; and determining whether to prune the child nodes of node n, convert n into a leaf node, or leave n intact, depending on the encoding cost; and the encoding cost is based on the code length C(n).

14. The method as recited in claim 13, wherein:

a) the step of encoding the decision tree includes the steps of:

(i) encoding each node of the decision tree using one bit, if the node has two or no child nodes;

(ii) encoding each node of the decision tree using two bits, if the node has one, two, or no child nodes; and (iii) encoding each internal node of the decision tree using log(3) bits; and b) the encoding cost includes:

(i) a cost for encoding an attribute value v of an attribute A, where a split test is of the form (A$\leq$v) and A is numeric; and (ii) a cost related to $\ln(n_A)$ where $n_A$ is a number of times the split test is used in the tree and A is a categorical attribute.

15. The method as recited in claim 13, wherein:

each node n of the decision tree is encoded using one bit; and if the code length C(n) when n has both child nodes is more than C(n) when n is a leaf node, then the step of determining whether to prune includes the steps of:

pruning both child nodes of the node n; and converting the node n into a leaf node.

16. The method as recited in claim 15 further comprising the steps of:

for each node n of the pruned decision tree, evaluating the code length C(n) when n has only a left child node, n has only a right child node, and n has both child nodes; and selecting a pruning option that results in a shortest code length C(n).

17. The method as recited in claim 13, wherein:

each node n of the decision tree is encoded using two bits; and the step of determining whether to prune includes the steps of:

evaluating the code length C(n) when n is a leaf node, n has only a left child node, n has only a right child node, and n has both child nodes; and selecting a pruning option that results in a shortest code length C(n).

18. A computer program product for use with a computer system for directing the system to generate a decision-tree classifier from a training set of records, each record having: (i) at least one attribute, each attribute having a value, (ii) a class label of the class to which the record belongs, and (iii) a record ID, the computer program product comprising:

a computer readable medium;

means, provided on the computer-readable medium, for directing the system to generate an attribute list for each attribute of the records, each entry in the attribute lists having the attribute value, class label, and record ID of the record from which the attribute value is obtained;

means, provided on the computer-readable medium, for directing the system to sort the attribute lists for numeric attributes based on attribute values; and means, provided on the computer-readable medium, for directing the system to create a decision tree by repeatedly partitioning the records using the attribute lists, the resulting decision tree becoming the decision-tree classifier.

19. The computer program product as recited in claim 18, wherein the attributes include categorical attributes.

20. The computer program product as recited in claim 18, wherein:

the decision tree includes a root node, a plurality of interior nodes, and a plurality of leaf nodes, all of the records initially belonging to the root node; and the means for directing to create a decision tree includes, for each node being examined and until each leaf node of the decision tree contains records from only one class:

a) means, provided on the computer-readable medium, for directing the system to determine a split test to best separate the records at the examined node by record classes, using the attribute lists; and b) means, provided on the computer-readable medium, for directing the system to split the records of the examined node according to the split test at the examined node to create child nodes of the examined node, the child nodes becoming new leaf nodes.

21. The computer program product as recited in claim 20, wherein the means for directing to determine a split test is based on a splitting index corresponding to a criterion for splitting the records.

22. The computer program product as recited in claim 21 wherein the splitting index includes a gini index based on relative frequencies of records from each record class present in the training set.

23. The computer program product as recited in claim 21, wherein:

each leaf node includes, for each attribute of the records at the leaf node, a plurality of histograms representing the class distribution of the records at the leaf node; and the means for directing to determine a split test includes:

a) means, provided on the computer-readable medium, for directing the system to traverse, for each attribute A, the attribute list for A at the examined node;

b) for each value v of A in the attribute list for A:

i) means, provided on the computer-readable medium, for directing the system to update the class histograms for A, at the examined node, with the class label corresponding to v and the value v; and ii) if the attribute A is numeric, then means, provided on the computer-readable medium, for directing the system to compute the splitting index corresponding to splitting criterion (A<=v) for the examined node; and c) if the attribute A is categorical, then means, provided on the computer-readable medium, for directing the system to determine a subset of the attribute A that results in the highest splitting index for the examined node.

24. The computer program product as recited in claim 23, wherein the histograms for each numeric attribute include a $C_{below}$ histogram and a $C_{above}$ histogram, the $C_{below}$ histogram corresponding to the class distribution of the entries in the attribute list for A that precede the value v, and the $C_{above}$ histogram corresponding to the class distribution of the entries in the attribute list for A that include the value v and those following the value v.

25. The computer program product as recited in claim 23, wherein the means for directing to determine a subset of the attribute A includes:

if a number of elements in a set S of all values of A is less than a predetermined threshold, then means, provided on the computer-readable medium, for directing the system to evaluate all subsets of the set S to find one with the highest splitting index; and if the number of elements in S is equal to or more than the predetermined threshold, then means, provided on the computer-readable medium, for directing the system to:

a) add an element of S to an initially empty subset S' of S such that the splitting index for the splitting criterion at the examined node is maximized; and b) repeat the step of adding until there is no improvement in the splitting index.

26. The computer program product as recited in claim 20, wherein the means for directing to split the records includes:

means, provided on the computer-readable medium, for directing the system to partition the attribute list for an attribute B used in the split test into new attribute lists corresponding, respectively, to the child nodes of the examined node;

means, provided on the computer-readable medium, for directing the system to build a hash table with the record IDs from the entries of the attribute list for B as the entries are partitioned among the new attribute lists;

means, provided on the computer-readable medium, for directing the system to partition the remaining attribute lists of the examined node among the newly created child nodes according to the hash table.

27. The computer program product as recited in claim 26, wherein the means for directing to partition the attribute list includes:
    means, provided on the computer-readable medium, for directing the system to traverse the attribute list for attribute B;
    means, provided on the computer-readable medium, for directing the system to apply the split test to each entry of the attribute list for B; and
    means, provided on the computer-readable medium, for directing the system to enter the entry into a respective new attribute list according to the split test.

28. The computer program product as recited in claim 26, wherein the means for directing to create a decision tree further comprises means, provided on the computer-readable medium, for directing the system to update the histograms for each newly created child node with the distribution of records at the child node.

29. The computer program product as recited in claim 20 further comprising means, provided on the computer-readable medium, for directing the system to prune the decision-tree classifier to obtain a more compact classifier.

30. The computer program product as recited in claim 29, wherein:
    the means for directing to prune is based on a Minimum Description Length (MDL) principle that encodes the decision tree as a model such that an encoding cost for describing the decision tree and the training set is minimized;
    the means for directing to prune includes:
        means, provided on the computer-readable medium, for directing the system to encode the decision tree in an MDL-based code;
        means, provided on the computer-readable medium, for directing the system to encode the split tests for the leaf nodes in the MDL-based code;
        means, provided on the computer-readable medium, for directing the system to calculate a code length C(n) for each node n of the decision tree; and
        means, provided on the computer-readable medium, for directing the system to determine whether to prune the child nodes of node n, convert n into a leaf node, or leave n intact, depending on the encoding cost; and
    the encoding cost is based on the code length C(n).

31. The computer program product as recited in claim 30, wherein:
    a) the means for directing to encode the decision tree includes:
        (i) means, provided on the computer-readable medium, for directing the system to encode each node of the decision tree using one bit, if the node has two or no child nodes;
        (ii) means, provided on the computer-readable medium, for directing the system to encode each node of the decision tree using two bits, if the node has one, two, or no child nodes; and
        (iii) means, provided on the computer-readable medium, for directing the system to encode each internal node of the decision tree using log(3) bits; and
    b) the encoding cost includes:
        (i) a cost for encoding an attribute value v of an attribute A, where a split test is of the form $(A \leq v)$ and A is numeric; and
        (ii) a cost related to $\ln(n_A)$ where $n_A$ is a number of times the split test is used in the tree and A is a categorical attribute.

32. The computer program product as recited in claim 30, wherein:
    each node n of the decision tree is encoded using one bit; and
    if the code length C(n) when n has both child nodes is more than C(n) when n is a leaf node, then the means for directing to determine whether to prune includes:
        means, provided on the computer-readable medium, for directing the system to prune both child nodes of the node n; and
        means, provided on the computer-readable medium, for directing the system to convert the node n into a leaf node.

33. The computer program product as recited in claim 32 further comprising:
    means, provided on the computer-readable medium, for directing the system to evaluate, for each node n of the pruned decision tree, the code length C(n) when n has only a left child node, n has only a right child node, and n has both child nodes; and
    means, provided on the computer-readable medium, for directing the system to select a pruning option that results in a shortest code length C(n).

34. The computer program product as recited in claim 30, wherein:
    each node n of the decision tree is encoded using two bits; and
    the means for directing to determine whether to prune includes:
        means, provided on the computer-readable medium, for directing the system to evaluate the code length C(n) when n is a leaf node, n has only a left child node, n has only a right child node, and n has both child nodes; and
        means, provided on the computer-readable medium, for directing the system to select a pruning option that results in a shortest code length C(n).

35. A database system for generating a decision-tree classifier from a training set of records, each record having: (i) at least one attribute, each attribute having a value, (ii) a class label of the class to which the record belongs, and (iii) a record ID, the system comprising:
    means for generating an attribute list for each attribute of the records, each entry in the attribute lists having the attribute value, class label, and record ID of the record from which the attribute value is obtained;
    means for sorting the attribute lists for numeric attributes based on attribute values; and
    means for creating a decision tree by repeatedly partitioning the records using the attribute lists, the resulting decision tree becoming the decision-tree classifier.

36. The system as recited in claim 35, wherein the attributes include categorical attributes.

37. The system as recited in claim 35, wherein:
    the decision tree includes a root node, a plurality of interior nodes, and a plurality of leaf nodes, all of the records initially belonging to the root node; and
    the means for creating a decision tree includes, for each node being examined and until each leaf node of the decision tree contains records from only one class:
        a) means for determining a split test to best separate the records at the examined node by record classes, using the attribute lists; and
        b) means for splitting the records of the examined node according to the split test for the examined node to create child nodes of the examined node, the child nodes becoming new leaf nodes.

38. The system as recited in claim 37, wherein the means for determining a split test is based on a splitting index corresponding to a criterion for splitting the records.

39. The system as recited in claim 38, wherein the splitting index includes a gini index based on relative frequencies of records from each record class present in the training set.

40. The system as recited in claim 38, wherein:

each leaf node includes, for each attribute of the records at the leaf node, a plurality of histograms representing the class distribution of the records at the leaf node; and the means for determining a split test includes:
a) for each attribute A, means for traversing the attribute list for A at the examined node;
b) for each value v of A in the attribute list for A:
  i) means for updating the class histograms for A, at the examined node, with the class label corresponding to v and the value v; and
  ii) if the attribute A is numeric, then means for computing the splitting index corresponding to splitting criterion (A<32 v) for the examined node; and
c) if the attribute A is categorical, then means for determining a subset of the attribute A that results in the highest splitting index for the examined node.

41. The system as recited in claim 40, wherein the histograms for each numeric attribute include a $C_{below}$ histogram and a $C_{above}$ histogram, the $C_{below}$ histogram corresponding to the class distribution of the entries in the attribute list for A that precede the value v, and the $C_{above}$ histogram corresponding to the class distribution of the entries in the attribute list for A that include the value v and those following the value v.

42. The system as recited in claim 40, wherein the means for determining a subset of the attribute A includes:

if a number of elements in a set S of all values of A is less than a predetermined threshold, then means for evaluating all subsets of the set S to find one with the highest splitting index; and if the number of elements in S is equal to or more than the predetermined threshold, then:
a) means for adding an element of S to an initially empty subset S' of S such that the splitting index for the splitting criterion at the examined node is maximized; and
b) means for repeating the step of adding until there is no improvement in the splitting index.

43. The system as recited in claim 37, wherein the means for splitting the records includes:

means for partitioning the attribute list for an attribute B used in the split test into new attribute lists corresponding, respectively, to the child nodes of the examined node;

means for building a hash table with the record IDs from the entries of the attribute list for B as the entries are partitioned among the new attribute lists; and means for partitioning the remaining attribute lists of the examined node among the newly created child nodes according to the hash table.

44. The system as recited in claim 43, wherein the means for partitioning the attribute list includes:

means for traversing the attribute list for attribute B;

means for applying the split test to each entry of the attribute list for B; and means for entering the entry into a respective new attribute list according to the split test.

45. The system as recited in claim 43, wherein the means for creating a decision tree further comprises means for updating the histograms for each newly created child node with the distribution of records at the child node.

46. The system as recited in claim 37 further comprising means for pruning the decision-tree classifier to obtain a more compact classifier.

47. The system as recited in claim 46, wherein:

the means for pruning is based on a Minimum Description Length (MDL) principle that encodes the decision tree as a model such that an encoding cost for describing the decision tree and the training set is minimized;

the means for pruning includes:
means for encoding the decision tree in an MDL-based code;
means for encoding the split tests for the leaf nodes in the MDL-based code;
means for calculating a code length C(n) for each node n of the decision tree; and
means for determining whether to prune the child nodes of node n, convert n into a leaf node, or leave n intact, depending on the encoding cost; and the encoding cost is based on the code length C(n).

48. The system as recited in claim 47, wherein:
a) the means for encoding the decision tree includes:
  (i) means for encoding each node of the decision tree using one bit, if the node has two or no child nodes;
  (ii) means for encoding each node of the decision tree using two bits, if the node has one, two, or no child nodes; and
  (iii) means for encoding each internal node of the decision tree using log(3) bits; and
b) the encoding cost includes:
  (i) a cost for encoding an attribute value v of an attribute A, where a split test is of the form ($A \leq v$) and A is numeric; and
  (ii) a cost related to $\ln(n_A)$ where $n_A$ is a number of times the split test is used in the tree and A is a categorical attribute.

49. The system as recited in claim 47, wherein:

each node n of the decision tree is encoded using one bit; and if the code length C(n) when n has both child nodes is more than C(n) when n is a leaf node, then the means for determining whether to prune includes:
means for pruning both child nodes of the node n; and
means for converting the node n into a leaf node.

50. The system as recited in claim 49 further comprising:

for each node n of the pruned decision tree, means for evaluating the code length C(n) when n has only a left child node, n has only a right child node, and n has both child nodes; and means for selecting a pruning option that results in a shortest code length C(n).

51. The system as recited in claim 47, wherein:

each node n of the decision tree is encoded using two bits; and the means for determining whether to prune includes:
means for evaluating the code length C(n) when n is a leaf node, n has only a left child node, n has only a right child node, and n has both child nodes; and
means for selecting a pruning option that results in a shortest code length C(n).

* * * * *